United States Patent
Aleksy et al.

(10) Patent No.: US 9,741,088 B2
(45) Date of Patent: Aug. 22, 2017

(54) MOBILE DEVICE WITH CONTEXT SPECIFIC TRANSFORMATION OF DATA ITEMS TO DATA IMAGES

(71) Applicant: ABB Technology AG, Zürich (CH)

(72) Inventors: Markus Aleksy, Ludwigshafen (DE); Bernd Stieger, Plankstadt (DE); Mikko Rissanen, Singapore (SG)

(73) Assignee: ABB Schweiz AG, Baden (CH)

( * ) Notice: Subject to any disclaimer, the term of this patent is extended or adjusted under 35 U.S.C. 154(b) by 73 days.

(21) Appl. No.: 14/200,535

(22) Filed: Mar. 7, 2014

(65) Prior Publication Data

US 2014/0253571 A1    Sep. 11, 2014

(30) Foreign Application Priority Data

Mar. 7, 2013  (EP) ..................................... 13001146

(51) Int. Cl.
G06T 1/60 (2006.01)
H04M 1/725 (2006.01)
G09G 5/395 (2006.01)

(52) U.S. Cl.
CPC .............. *G06T 1/60* (2013.01); *G09G 5/395* (2013.01); *H04M 1/72569* (2013.01); *G09G 2354/00* (2013.01); *G09G 2360/08* (2013.01); *G09G 2360/127* (2013.01)

(58) Field of Classification Search
CPC ...................................................... G06T 1/60
USPC ......................................................... 345/531
See application file for complete search history.

(56) References Cited

U.S. PATENT DOCUMENTS

| | | | |
|---|---|---|---|
| 7,889,205 B1* | 2/2011 | Parenteau et al. | 345/545 |
| 7,940,285 B2* | 5/2011 | Would et al. | 345/637 |
| 2003/0132959 A1* | 7/2003 | Simister | G06F 8/38 715/746 |
| 2005/0237329 A1* | 10/2005 | Rubinstein et al. | 345/531 |
| 2007/0216712 A1* | 9/2007 | Louch | 345/660 |
| 2007/0274400 A1* | 11/2007 | Murai | H04N 21/23430 375/240.26 |
| 2009/0079547 A1 | 3/2009 | Oksanen et al. | |
| 2009/0150184 A1* | 6/2009 | Spahn | G06F 19/321 705/3 |

(Continued)

FOREIGN PATENT DOCUMENTS

| | | |
|---|---|---|
| CA | 2720395 A1 | 5/2012 |
| WO | 2005083672 A2 | 9/2005 |

OTHER PUBLICATIONS

Extended European Search Report, European Application No. 13001146.3-1858, Aug. 26, 2013, 6 pages.

*Primary Examiner* — Kee M Tung
*Assistant Examiner* — Yanna Wu
(74) *Attorney, Agent, or Firm* — Barnes & Thornburg LLP

(57) ABSTRACT

In a mobile device with a processing unit, main memory, display memory and display, a context module identifies a user-context, a determiner module determines correspondence or non-correspondence of data images in the main memory to the user-context, a first selector module selects corresponding data images for access by the display memory in case of correspondence, a second selector module select data items in case of non-correspondence, a transformation module transforms selected data items to corresponding data images and stores them in the main memory, and an access module lets the display memory access the selected data images.

20 Claims, 6 Drawing Sheets

(56) References Cited

U.S. PATENT DOCUMENTS

2011/0258153 A1* 10/2011 Kamar ................. G06Q 10/109
 706/12
2012/0233211 A1* 9/2012 Hassan ............. G06F 17/30424
 707/770
2014/0002465 A1* 1/2014 Kwa et al. .................... 345/502

* cited by examiner

US 9,741,088 B2

MOBILE DEVICE WITH CONTEXT SPECIFIC TRANSFORMATION OF DATA ITEMS TO DATA IMAGES

RELATED APPLICATION

This application claims priority under 35 U.S.C. §120 to EP 13001146.3 which was filed in Europe on Mar. 7, 2013, the entire content of which is hereby incorporated by reference in its entirety.

FIELD

The present disclosure generally relates to mobiles devices, such as mobile phones and mobile computing devices (e.g., laptops and/or tablet computers), and more particularly, to mobile devices with a role-specific user interaction to display images on screen.

BACKGROUND INFORMATION

Mobile devices, such as mobile phones and mobile computing devices (e.g., laptops and/or tablet computers), are used frequently by people in industry or agriculture. For example, a user who performs maintenance or repair work in a factory operates the mobile device(s) to read information that relates to his/her work. There are scenarios where the mobile device communicates with a back-end system over a cellular phone system (e.g., GSM, UMTS, HSPA, LTE) or a wireless computer system (e.g., WLAN). The back-end system can be an enterprise resource planning system (ERP system) to provide work related data to the user.

The mobile device has a display with objects such as text messages, graphics, pictures, maps, photos, or even video sequences. Much simplified, the display is coupled to a display memory (or frame buffer) in which data is available for each pixel of the display. However, making data images available in memory—often referred to as transforming or rendering—is a process that requires computation, by a general processor of the mobile device (central processing unit CPU), and/or by specialized processors (such as a graphics processing unit (GPU)). During this transformation process, data items are converted to data images. For example, a string of characters for the word "ATTENTION" is converted to a data image by composing the image from pre-defined elements (like fonts) for each character. Alternatively, in a further example, a map of the factory is composed from image elements (symbols for engines, footways, or the like) and text elements. Especially for mobile devices, the transformation process is not free of technical constraints. For example, the transformation process drains energy from the battery of the device. In addition, until the object becomes available on screen, the user might perceive a waiting time. Further, in case data items are retrieved from remote servers (e.g., the above-mentioned ERP system), there are further limitations in terms of bandwidth and costs.

SUMMARY

An exemplary embodiment of the present disclosure provides a method for operating a mobile device having a display, a main memory and a display memory that is coupled to the display. The exemplary method includes identifying, by a processor of the mobile device, a user-context, and determining, by the processor, a correspondence or non-correspondence of data images to the user-context. The data images are stored in the main memory of the mobile device. The exemplary method also includes, in case of correspondence, selecting corresponding data images in the main memory for access by the display memory. In addition, the exemplary method includes, in case of non-correspondence, selecting data items according to the user-context from a plurality of data items, transforming, by the processor, the selected data items to corresponding data images to store the corresponding data images in the main memory of the mobile device, and selecting the corresponding data images in the main memory for access by the display memory. Further, the exemplary method includes accessing selected data images by the display memory.

An exemplary embodiment of the present disclosure provides a non-transitory computer-readable recording medium having tangibly recorded thereon a computer program that causes a processor of a mobile device having a display, a main memory and a display memory that is coupled to the display, to, when the program is executed, carry out a method of operating the mobile device. The method includes identifying a user-context, and determining a correspondence or non-correspondence of data images to the user-context. The data images are stored in the main memory of the mobile device. The method also includes, in case of correspondence, selecting corresponding data images in the main memory for access by the display memory. In addition, the method includes, in case of non-correspondence, selecting data items according to the user-context from a plurality of data items, transforming the selected data items to corresponding data images to store the corresponding data images in the main memory of the mobile device, and selecting the corresponding data images in the main memory for access by the display memory. Further, the method includes accessing selected data images by the display memory.

An exemplary embodiment of the present disclosure provides a mobile device which includes a display, a processing unit, a main memory having tangibly recorded thereon an executable computer program, and a display memory coupled to the display. The processing unit, in combination with the main memory and the display memory is configured to execute the computer program to provide: a context module to identify a user-context; a determiner module to determine correspondence or non-correspondence of data images in the main memory to the user-context; a first selector module to select corresponding data images for access by the display memory in case of correspondence; a second selector module to select data items in case of non-correspondence; a transformation module to transform selected data items to corresponding data images and to store them in the main memory; and an access module to allow the display memory to access the selected data images.

BRIEF DESCRIPTION OF THE DRAWINGS

Additional refinements, advantages and features of the present disclosure are described in more detail below with reference to exemplary embodiments illustrated in the drawings, in which.

Figure 1:
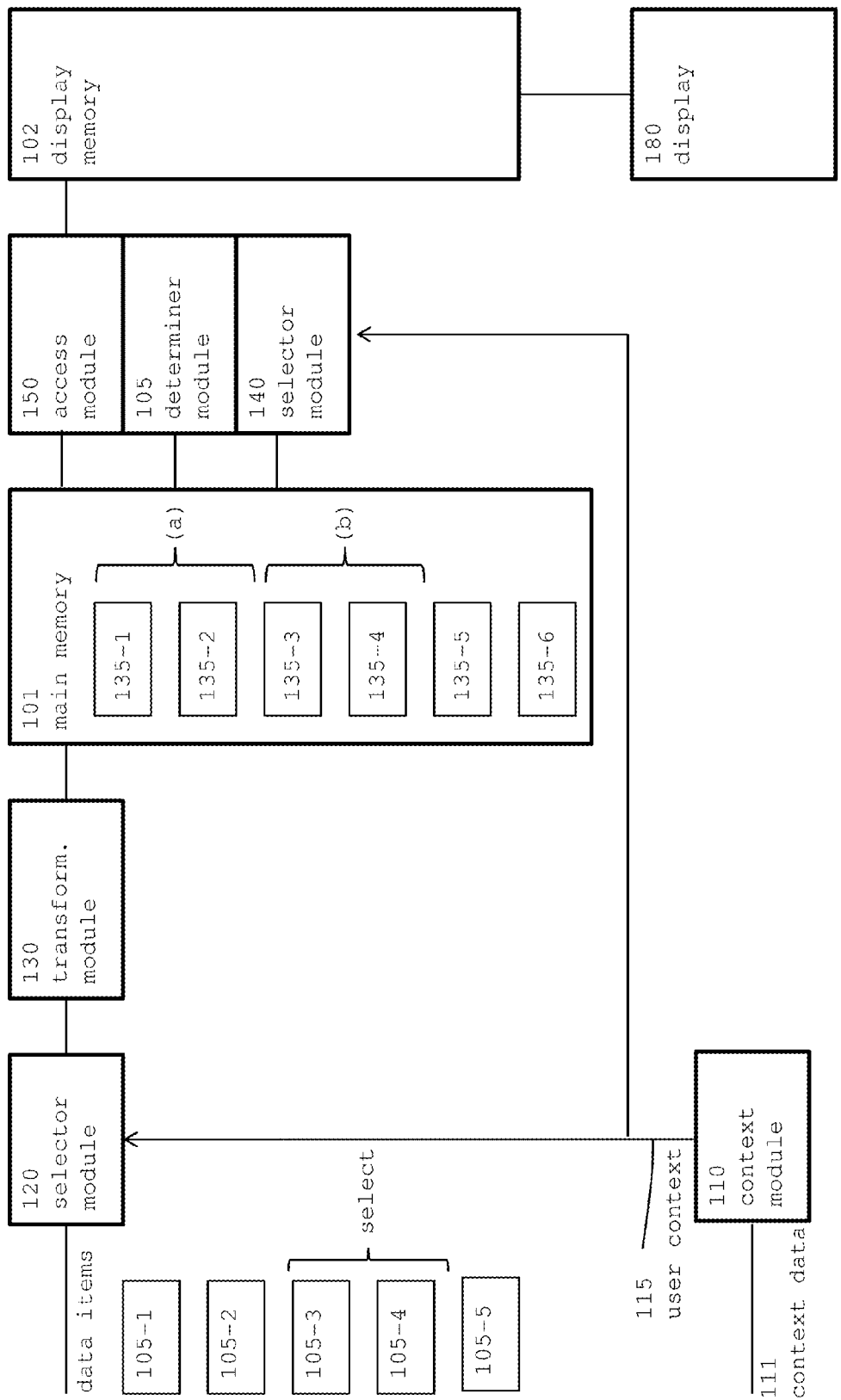
FIG. 1 illustrates an overview block diagram of a mobile device.

The following description of exemplary embodiments of the present disclosure explains the approach by an illustrative scenario. Although the present disclosure is described by way of example, the examples described herein are not limiting in any sense but are used only for explaining the conceptual approach.

DETAILED DESCRIPTION

Exemplary embodiments of the present disclosure provide a computer-implemented method for operating a mobile device, a mobile device, and a non-transitory computer-readable recording medium (e.g., a non-volatile memory such as a ROM, hard disk drive, flash memory, etc.) having a computer program recorded thereon that causes a processor of a mobile device to carry out the operative functions of the method as described herein. The mobile device includes a processing unit, a main memory and a display memory. The processing unit includes a processor which may be a general-purpose processor such as those produced by Intel® or AMD®, for example. Alternatively, the processor may be an application specific processor which is specifically designed for the mobile device. According to an exemplary embodiment, the main memory constitutes a non-transitory computer-readable recording medium which has tangibly recorded thereon a computer program and/or computer-readable instructions which, when executed by a processor of the mobile device, cause the processor to perform the operative functions of the movie device as described herein.

In accordance with an exemplary embodiment, the main memory is associated with a central processing unit (CPU, e.g., processor) of the processing unit, and the display memory (or frame buffer) is associated with a graphic processing unit (GPU) of the processing unit. The display memory is communicatively coupled to a display (or screen). The display memory can be implemented as a shared portion of the main memory. The processing unit in combination with the main memory and the display memory is configured to provide modules, which are each components of the processing unit executing the computer program and/or computer-readable instructions tangibly recorded on the above-described non-transitory computer-readable recording medium for performing the respective functions of those components of the processing unit.

In accordance with an exemplary embodiment, the main memory and the display memory are cooperating and/or functionally coupled, in particular by means of the provided processing units (CPU and GPU) and/or the respective modules, wherein the main memory allows and/or provides access to data images and/or data items.

While executing the computer-implemented method, the mobile device uses the modules as follows: a context module identifies a user-context. A determiner module determines correspondence or non-correspondence of data images to the user-context, with data images being stored in the main memory. A first selector module selects corresponding data images for access by the display memory in case of correspondence. A second selector module selects data items in case of non-correspondence. A transformation module transforms selected data items to corresponding data images and stores them in the main memory. An access module lets the display memory access the selected data images.

In other words, context information can be used to adapt a user interface to the current needs and situation of the user so that the information support to the user and the usability are improved.

In accordance with an exemplary embodiment, the transformation module can be implemented by the GPU, and the GPU can return the data image to the main memory.

In other words, data items to be transformed are selected according to the context of the user, so that only a fraction of available data items is actually to be rendered. The data images—that result from transforming—are not immediately copied to the display memory for displaying, but are temporarily stored in memory portions of the main memory. From the memory portions, image data is selected—again according to the context of the user—for displaying by copying to the display memory, or by allowing the display memory to access the selected data images. It can be advantageous that once data images are transformed, they can remain in memory until displaying is required. Transforming (or rendering) is limited to a minimum. Especially in situations where the user-context is frequently changing—as in the above-mentioned factory—the already available data images are taken from memory to be displayed. For example, a user moving through the factory changes his/her role and activities periodically. This approach also allows anticipatory rendering, for example, at time points when the mobile device has sufficient capacity, such as during non-battery operation, or while communicating to the back-end system with high bandwidth.

In accordance with an exemplary embodiment, the transforming or rendering of data items is a process that requires computation and/or processing by the transformation module and/or the general processor of the respective device (central processing unit CPU), and/or by a specialized processor (such as a graphics processing unit GPU), wherein during this transformation process, data items are converted to data images. For example, these data images can include or contain image data, which may be in a respective image or data format, wherein the data images and/or format can be directly be sent to or stored in the main memory or the display memory for further processing and/or display and/or visualization.

In accordance with an exemplary embodiment, selecting data images can include providing a layout of the selected data image that is adapted to the display. The layout is the arrangement of the data image on the display. Providing the layout is thereby independent from selecting data items.

In accordance with an exemplary embodiment, selecting data images can include enlarging the data image and/or reducing the size of the data image. Enlarging or shrinking the data image allows fitting data images to the screen. According to an exemplary embodiment, the device can have user interface elements which allow the user to manually adjust the size of the image, or to modify the layout of the image. Exemplary user interface elements can be scroll bars, gesture controls, or the like.

In accordance with an exemplary embodiment, selecting data images can include prioritizing the access of the selected data images by the display memory. Displays of mobile devices can have a limited number of pixels and/or display dimensions. Therefore, there is a conflict between available screen space and image size, but prioritized selection can address that issue. Selecting available data images can include de-selecting existing data images and preventing the access from display memory of that de-selected data images.

In accordance with an exemplary embodiment, transforming can include providing data images that have a pixel dimension that corresponds to the pixel dimension of the display. The pixel dimension is the number of picture elements in horizontal and vertical directions on the display. In such an embodiment, with equal dimension of data image and display, a single data image can cover the display as a whole. In other words, such a data image can be regarded as a layer.

In accordance with an exemplary embodiment, selecting data images can include overwriting the data image in the display memory. Such an overwrite can be partial. The new data image can be smaller (smaller dimension) as the old data image (larger dimension). Overwriting the data image in display memory can keep the data image in the main memory, so if due to context changes, the data image has to be presented again on display, it can be taken from the main memory.

FIG. 1 illustrates an overview block diagram of a mobile device 100 with a display 180. Mobile device 100 has a processing unit (or processor) that can be implemented by a central processing unit (CPU) and by a graphic processing unit (GPU). Mobile device 100 has a memory that can be implemented by main memory 101 and display memory 102. Main memory 101 can be implemented as a non-volatile memory and/or random access memory (RAM) that is associated with the CPU, and display memory 102 can be associated with the GPU. Display memory 102 (also known as frame buffer) is communicatively coupled to display (or screen) 180. Display memory 102 has portions that can be assigned to pixels of display 180. For example, there can be approximately 480,000 portions for a display with an array of 600×800 pixels. Display memory 102 can be implemented by shared portion in main memory 101.

Mobile device 100 is portable to be carried by a human user. Mobile device 100 is operated by the user through a user interface (UI). The UI is implemented by an output device (e.g., the mentioned display), and by an input device (e.g., keyboard, pointing device or similar arrangements). Mobile device 100 can have a touch-screen that serves both as an output and input device. Mobile device 100 can include further interfaces to communicate with other devices, and/or with remote computers in networks. Mobile device 100 can also be implemented as a mobile phone, so that the user can communicate acoustically with other persons. For example, mobile device 100 can be implemented by a so-called "smart phone" that is battery powered and that has wireless network interfaces (e.g., WLAN or cellular phone).

Mobile device 100 can include components to determine a geographical location, with well-know approaches, including satellite based systems (Global Positioning System, GPS; Galileo; etc.), triangulation, WLAN detection, manual input (from the users) or the like. Mobile device 100 can include components to determine attributes such as the time (cf. build-in system clock), the available bandwidth of a communication link in a network (WLAN, cellular phone), the remaining time of operation until battery failure (battery status) or the like.

The processing units in combination with the memory can be configured to provide the following modules: context module 110, determiner module 105, selector modules 140 and 120, transformation module 130 (or rendering module, or renderer), and access module 150.

Context module 110 receives situational information regarding mobile device 100 and the user—context data 111—and processes context data 111 to identify user-context 115. Context is a well-known principle, explained and defined, for example, by Dey, A. K as "any information that can be used to characterize the situation of an entity." An entity can be "a person, place, or object that is considered relevant to the interaction between a user and an application, including the user and applications themselves." (Understanding and using context. Personal Ubiquitous Computing, vol. 5(1), pages 4-7, 2001). User-context 115 can be maintained by one or more context attributes that can be implemented, for example, by predefined strings, table entries, signals or the like. The description puts example attributes into quotation marks.

Context data 111 is available at an input of context module 110 and lets context module 110 determine the context attributes. In an example scenario that is used for illustrating the present disclosure, context data 111 is related to the person of the user. In other words, the context is user-context in the sense that it characterizes the situation of the user.

For example, context data 111 can represent the role of the user in the sense that the user works in different roles. Also, the roles can periodically change. In other words, the role of the user is not only a static role, but can also be a dynamic role. For example, as the user walks through a factory, he/she performs tasks in the roles of a technician, of an engineer, and again of a technician.

For example, context data 111 can represent the activity of the user. In case that mobile device 100 performs a workflow program, the status of workflow items is provided as context data 111 to the input of context module 110. For example, mobile device 100 can process data that indicate the activity of the user walking through the factors, performing a particular task such as repair work, or the like. The activity can be activity in the past (e.g., in the last hour), current activity, or future activity (e.g., through the end of the working shift in the factory).

For example, context data 111 can represent a skill set of the user (or professional qualification), as for example, beginner knowledge or advanced knowledge regarding a particular task. Data that identifies a particular user, for example, user ID data can be context as well.

For example, context data 111 can represent the environment of mobile device 100. For example, a temperature sensor can trigger context module 110 to determine an "extreme temperature" situation in that the users need to be advised to use gloves.

For example, context data 111 can represent the geographic location of the user. Since the mobile device is carried by the user, the location of the device is the location of the user. In the example, the location can be classified by attributes such as "factory", "street", "office" or others. The location can also be indicated by coordinates.

From the various sources of context data 111, context module 110 can provide user-context 115 by multiple context attributes. For example, the attributes "location=factory" and "role=engineer" indicate the context that the user is an engineer in a factory. User-context 115 can be enhanced by a device context. For example "battery=near empty", or "connection to server lost" can be attributes that impact the operation of the device by the user.

Data items 105-1 . . . 105-5 represent information that might be of interest to the user, but not all data 105-1 . . . 105-5 have to be displayed to the user. The selection uses user-context 115. An example for a context sensitive selection is the selection of safety information for users moving through the factory. For example, such information can be the instruction to protect the ears against noise or to protect the hands against freezing air temperature.

Alternatively, the user with the combined attributes "role=reliability engineer" AND "activity=maintenance" need so-called lubrication information, such as the indication of a particular lubricant (or oil) for a particular engine in the factory. Or, safety instructions can be attributed to a check list in a workflow (pull the power plug from the engine, check the list) and have to be presented prior to detailed working instructions.

Data items 105-1 . . . 105-5 can be available at the input of selector module 120, for example, from a data base that is internal to device 100, from a data base at a remote server (cf. network connection), or from other sources.

However, data items 105-1 . . . 105-5 can be available in a technical format that is optimized, for example, to save memory in the data bases (and/or to save communication bandwidth for data bases on remote computers). The data items can be transformed to data images prior to display. For example, for a user-context 115 with the attribute "ear protect", a data item 105 with a text string "please use ear protectors" (or a pictogram picture) has to be converted to data image 135 that could be displayed by display 180. In other words, an item from a data base can not directly control the pixels of the display.

As a side note, it should be mentioned that data items 105 can also be processed by context module 110 as context data 111, for example, when a remote computer transmits items that change the workflow of the user (e.g., the user receiving updated working instructions). The description continues with an explanation how both requirements (selection, and transformation) can be complied with in a computation efficient way.

Determiner module 105 determines correspondence or non-correspondence of data images 135-1 . . . 135-6 in the main memory 101 to the user-context 115. For example, main memory 101 might already store a pictogram picture (as a data image) that corresponds to the "ear protect" attribute of user-context 115. To identify correspondence or non-correspondence, main memory 101 can store the data images in combination with image attributes, wherein in particular attributes of user-context, like for example "ear protect", can be used as image attributes, or in other words data images are or can be stored in the main memory 101 in combination with image attributes. In case of correspondence, selector module 140 selects corresponding data images for access by display memory 101. The figure gives examples as data images 135-1 and 135-2. In case of non-correspondence, second selector module 120 select data items 105-3, 105-4, transformation module 130 transforms selected data items 105-3, 105-4 to corresponding data images 135-3, 135-4 and stores them in main memory 101.

In both cases—correspondence and non-correspondence—access module 150 lets display memory 102 access the selected data images. In the example of FIG. 1, display memory 102 accesses data images 135-1 and 135-2 that can be found corresponding (in the figure: reference (a)), and accesses (b) data images 135-3 and 135-4 that can be made corresponding (by selecting/transforming).

Figure 2:
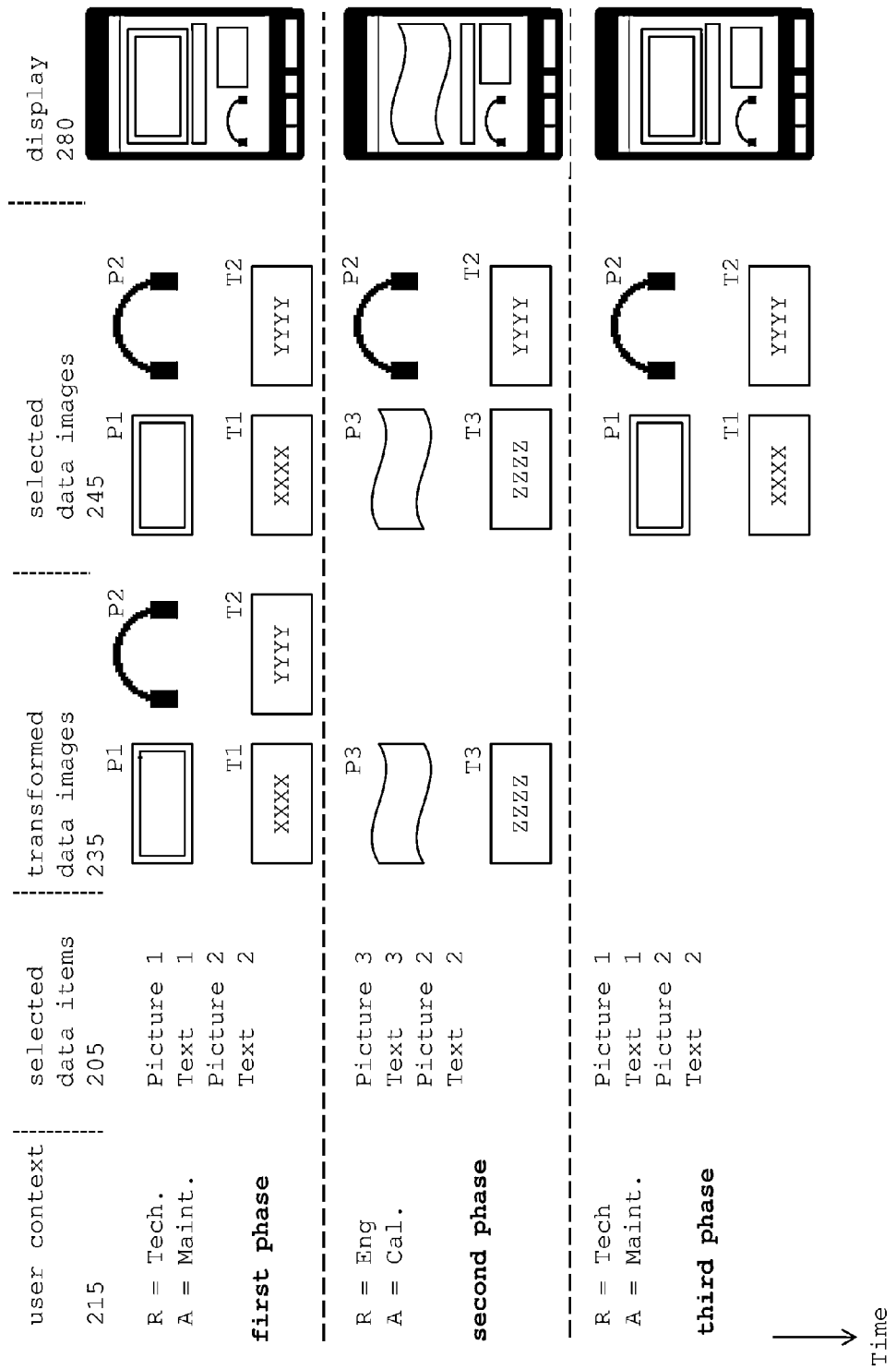
FIG. 2 illustrates a phase diagram for the operation of the mobile device according to an exemplary embodiment of the present disclosure.

FIG. 2 illustrates a phase diagram for the operation of the mobile device 200. The figure uses dashed lines to distinguish 3 exemplary phases. The time progressed top down.

In the first phase, user-context 215 is attributed for the user assuming the role (R) of a technician in the activity (A) of maintenance work. Selected data items 205 can be picture 1 with text 1, as well picture 2 with text 2. Picture 1 and text 1 can be, for example, instructions for the particular maintenance. Picture 1 could show a photo of the engine to be maintained and text 1 could include textual instructions. Picture 2 and text 2 can be, for example, safety instructions, with the picture being the above mentioned pictogram of the ear protector. In the example, it is assumed that corresponding data images in main memory 101 can be initially (prior to phase 1) not available. Selected data items 205 can be transformed (cf. transformer 130) to data images 235. For example, texts 1 and 2 can be transformed by processing a text string with letter fonts, and picture 1 and 2 can be available in a data base optimized format (e.g., JPEG, PNG, GIF). Once the transformation to data images 235 (T1/P1, T2/P2) is completed, the data images can be selected 245 to be displayed on display 280.

In the second phase, user-context 215 has slightly changed. The user has switched to the role (R) of an engineer who has to calibrate the engine. Selected data items 205 can be picture 3 and text 3 with calibration details and— unchanged—safety instructions in picture 2 and text 2. Corresponding data images can be determined (images 235: P2/T2). For the non-corresponding data items (picture 3, text 3), the transformation is performed, and data items P2/T2, P3/T3 can be displayed. Since P2/T2 is already available in memory, there is no need to transform picture 2 and text 2 again.

In the third phase, user-context 215 has returned to the original state (of the first phase). Since the corresponding data images can be still available in memory, there is no need to transform any data items. Hence, a transformation is not applicable, and computation is saved.

Figure 3:
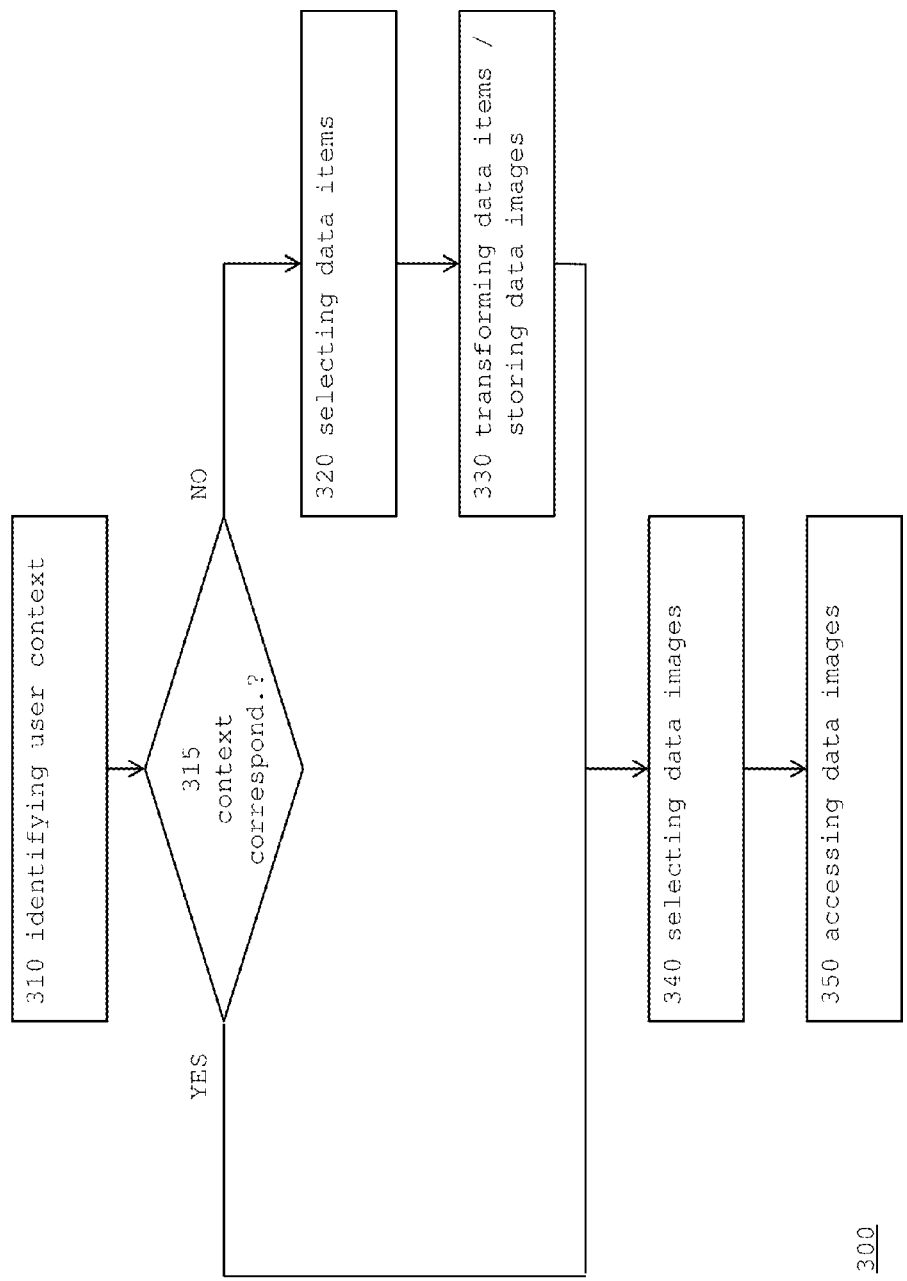
FIG. 3 illustrates a flowchart diagram of a computer-implemented method according to an exemplary embodiment of the present disclosure.

FIG. 3 illustrates a flowchart diagram of a computer-implemented method 300. Computer-implemented method 300 for operating a mobile device with a main memory and with a display memory that is coupled to a display includes the following activities or steps: In step identifying 310, a user-context is identified. In step determining 315, correspondence or non-correspondence of data images in the main memory (of the mobile device) is determined in relation to the user-context, in particular by evaluating and/or analysing and/or comparing image attributes and attributes of user-context. In case of correspondence, in step selecting 340, corresponding data images can be selected in the main memory for access by the display memory. In case of non-correspondence, in step selecting 320, data items can be selected according to the user-context from a plurality of data items. Also, in step transforming 330, the selected data items can be transferred (or rendered) to corresponding data images, and the corresponding data images can be stored in the main memory of the mobile device. In step selecting 340, the corresponding data images can be selected in the main memory for access by the display memory. In both cases, in step accessing 350, the selected data images can be accessed by the display memory (so that the user can see the images on the display).

FIG. 3 also illustrates a computer program or a computer program product. The computer program product—when loaded into a memory of a computer and being executed by at least one processor of the computer—performs the steps of the computer-implemented method. So in other words, the blocks in FIG. 3 illustrate that method 300 and the device (cg. FIGS. 1-2) can be implemented by a computer under the control of the program.

Figure 4:
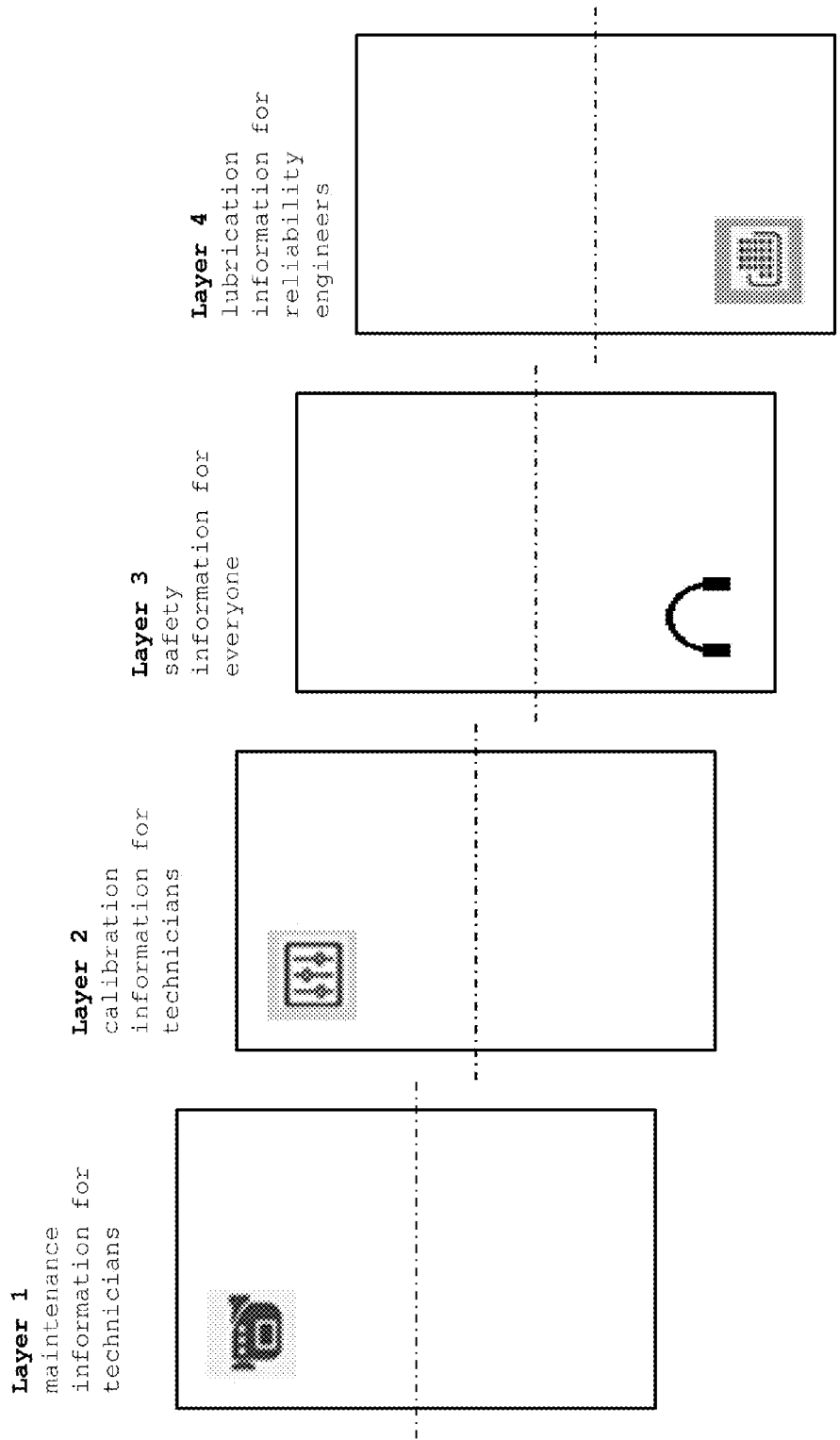
FIGS. 4-6 illustrate an embodiment of the mobile device with layers according to an exemplary embodiment of the present disclosure.
Figure 5:
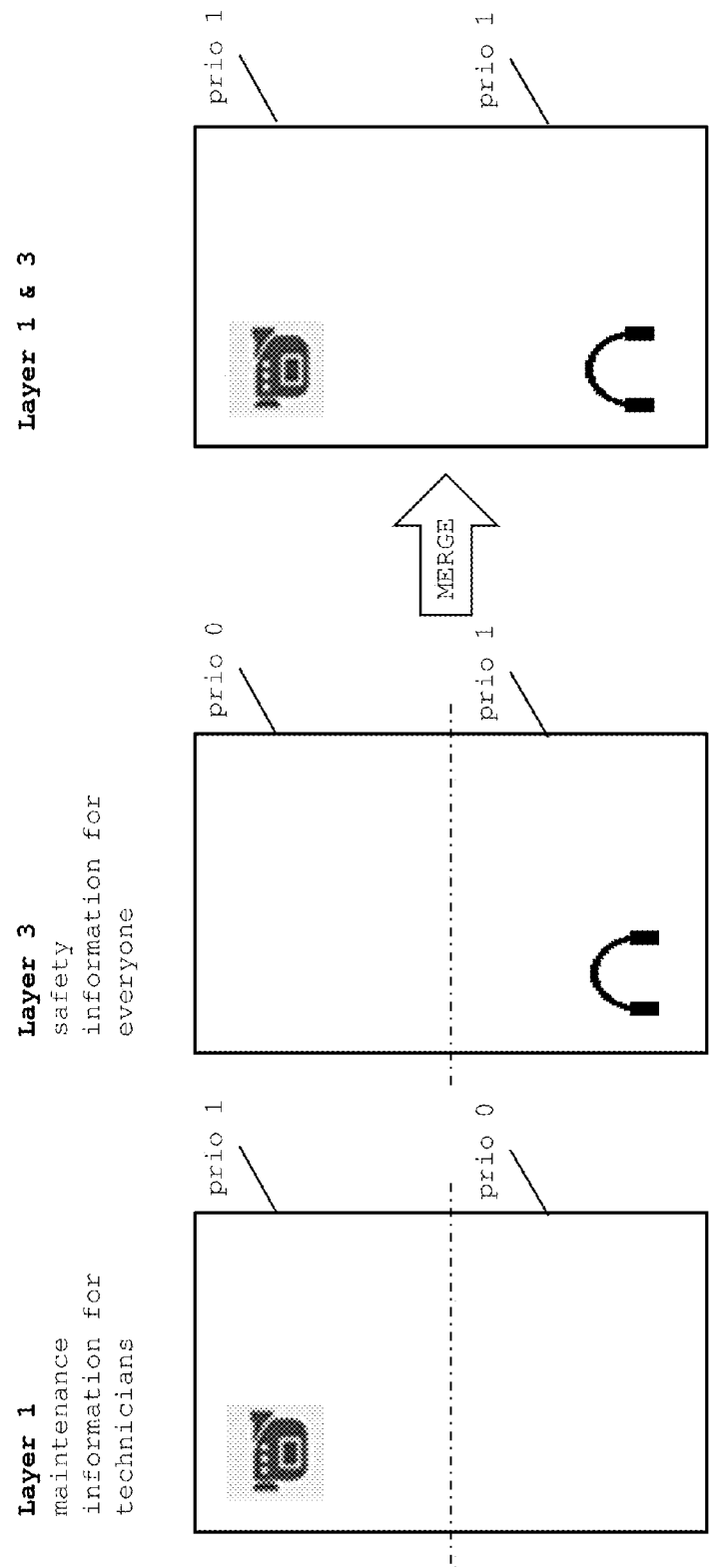
Figure 6:
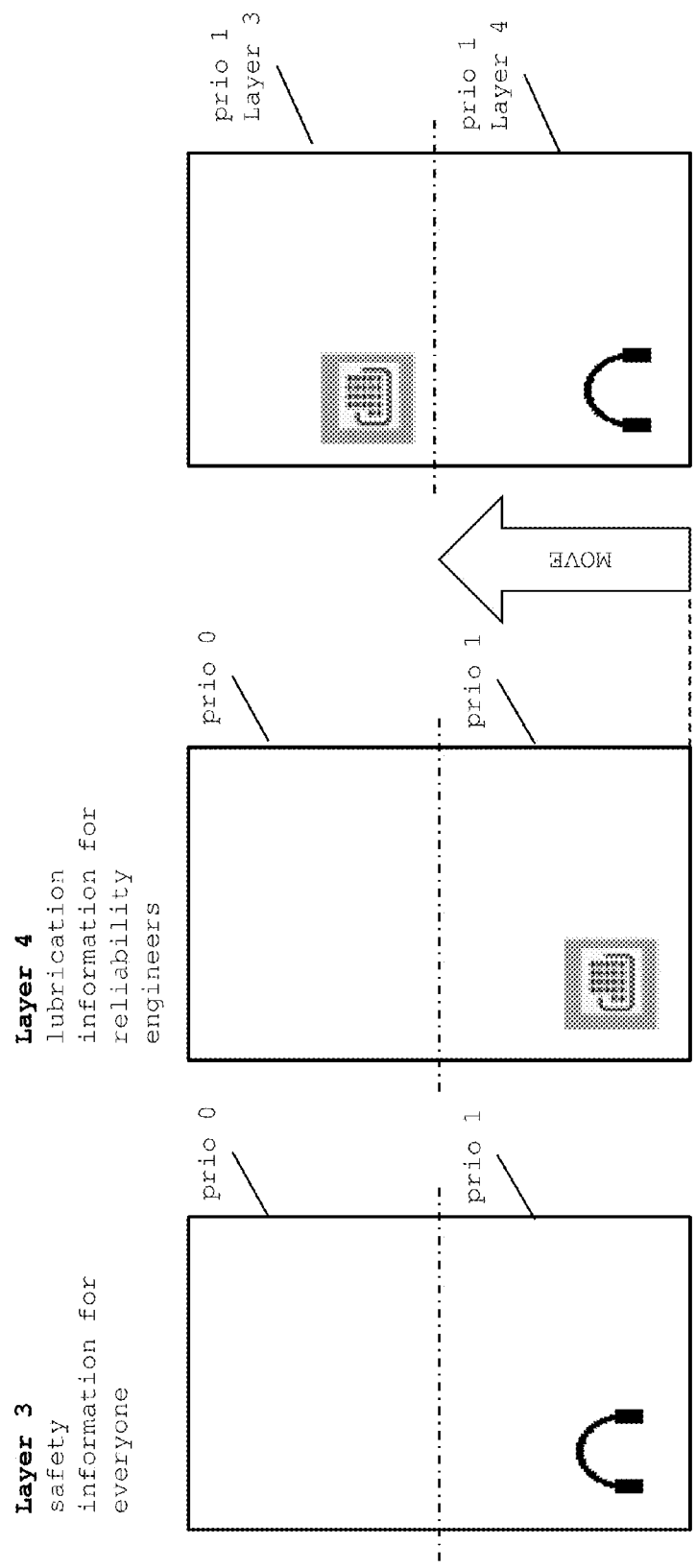

FIGS. 4-6 illustrate a further embodiment of the mobile device with layers. As used herein, layers can be data images in the size of a display. For the example of the display with 600×800 pixels, each layer has such a pixel dimension. The layers can have texts and pictures (like pictograms or photos). Each layer corresponds to respective data images stored in the main memory (of the mobile device).

The layers represent logical information layers, and the content of layers is determined by context attributes or a combination of context attributes as described above (e.g., user's role, activity, location).

Depending on the current context of the user, layers that match the context can be shown on the display of the device. Layers that do not match the current context can be omitted, so that the amount of information is reduced to the information that is relevant to the user The example of FIG. 4 uses a set of 4 layers. Layer 1 contains maintenance information for technicians, layer 2 contains calibration information for technicians, layer 3 contains safety information for everyone, and layer 4 contains lubrication information for reliability engineers. The figure illustrates the information by pictograms.

Depending on the user's context, one or more layers can be selected to the displayed simultaneously. The access module (cf. 150 in FIG. 1) can include logic at the pixel level that—at least partially—allows for overwriting layer information in the display memory. For example, layers can be divided into regions, such as an upper half or a lower half. The regions can be distinguished according to a priority. Layer 1 can contain the images with maintenance information in the upper half, and layer 3 can contain images with safety information in the lower half. Layer 1 contains images in a sub-ordinated priority in the lower half, and layer 3 contains images in a sub-ordinated priority in the upper half. The priorities can be pre-defined, for example, by a user interface designer. It is also possible to anticipate simultaneous display of two (or more) layers so that the layout for the layers can be provided in a non-overlapping way. Further, the priorities could be assigned dynamically based on the context attributes.

In the example of FIG. 5, the current context is set to the role as "technician" and to the activity "maintenance". Therefore data items (layers) 1 and 3 can be selected. The logic (in module 150) merges both layers 1 and 3. The sub-ordinated regions (e.g., priority 0) can be not displayed so that—as a result—layer 1 and 3 in combination display maintenance information at the upper half (cf. camera pictogram, priority 1) and safety information at the lower half (cf. the ear protector pictogram, also priority 1). Layers that do not correspond to the current context can be omitted. For example, layers 2 and 4 would be omitted. The lower half portions of layers 1 and 3 can be also omitted.

In the example of FIG. 6, the current context is set to the role "engineer" and to the activity "calibration". Layers 4 and 3 can be selected. The logic (in module 150) operates according to an alternative approach. Since both layers have priority regions at the same location (here: both at the lower half, prior 1), both priority regions would be in conflict. Therefore, the logic moves (or displaces) the layers such that a priority region (priority 1) of a first layer (here layer 4) is superimposed over the non-priority region (priority 0) of a second layer (here layer 3). In other words, there is a displacement of non-priority regions in favour of priority regions.

Instead of a binary priority distinction, those of skill in the art can introduce embodiments with multiple priorities and with a different number of layers. The priorities can be scaled linearly (priority 0, 1, 2 . . . ) or in hierarchy. Although prioritizing has been explained in connections with layers (being images of display size), prioritizing can also be applied to data images that can be small then the display size.

The description continues with an explanation of additional exemplary embodiments. Selecting data images can include to provide a layout of the selected data image that is adapted to the display. The layout is the arrangement of the data image on the display. For example in FIG. 2, the data image (P2, the hearing protector symbol) is shown on the lower left part of the display. Providing the layout is thereby independent from selecting data items. It is also possible to assign priorities to regions at the display.

Selecting data images can also include enlarging the data image and/or to reduce the size of the data image. Enlarging or shrinking the data image allows fitting data images to the screen. Optionally, the device can have user interface elements for letting the user manually adjust size of the image, or to modify the layout of the image. Example user interface elements can be scroll bars, gesture controls, or the like. The display of the mobile device usually has a limited number of pixels and/or display dimension. Therefore, there is a conflict regarding the screen space that is available.

Transforming can include providing data images that have a pixel dimension that corresponds to the pixel dimension of the display. In such an embodiment—as used in FIGS. 4-6—with equal dimension of data image and display, a single data image can cover the display as a whole. In other words, such a data image can be regarded as a layer.

Selecting available data images can include de-selecting data images (and/or removing from memory) and preventing the access from display memory.

Selecting the data images can include overwriting the data images in the display memory. Such an overwrite can be partial. For example, the new data image is smaller (smaller dimension) as the old data image (larger dimension). Overwriting the data image in display memory keeps the data image in the main memory, so if—due to context changes—the data image has to be presented again, it can be taken from the main memory.

Identifying the user-context can include processing data such as data that represents a role of a user, data that represent an activity of the user, data that represent a location of the mobile device, data that represent a status of workflow items that form part of the data items, data that represents a skill set of the user, and/or data that represents the environment of the mobile device. Concerning the workflow, for example, the user has to perform a maintenance check on an engine. For safety reasons, the user has to switch off the electrical power from the engine prior to any activity. An application running on the mobile device could have an interactive check-list for the user to affirmatively indicate that the power is switched off. This interactive check-list can be logically connected to the context module. Selecting data items that refer to maintenance details can be blocked as long as the engine is still under electrical power. However, it is also possible to block the maintenance details with a selection of other data images. This has the advantage that transforming can be performed while the context (e.g., maintenance details for the engine in "power off") is not yet available for display. When the user has switched off the power from the engine and entered this information into the device, the user-context switches and—without delay by transforming data items to data images—the device is ready to display relevant information.

Identifying the user-context can include processing data that is obtained through user interaction, for example, when user IDs can be processed and the role of the user is associated to the ID of a particular user. Also, the user can enter his/her role manually (e.g., selecting from a drop-down list).

Accessing the selected data images by the display memory can include displaying the selected data images in the display as a translucent image so that earlier displayed images remain visible.

Embodiments of the present disclosure can be implemented in digital electronic circuitry, or in computer hardware, firmware, software tangibly recorded on a non-transitory computer-readable recording medium and executed by such digital electronic circuitry, or in combinations thereof. The present disclosure can be implemented as a computer program product, for example, a computer program tangibly embodied in a non-transitory machine-readable storage device, for execution by, or to control the operation of, data processing apparatus, for example, a programmable processor, a computer, or multiple computers. A computer program as described herein can be written in any form of programming language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the present disclosure can be performed by one or more programmable processors executing a computer program to perform functions of the present disclosure by operating on input data and generating output. Method steps can also be performed by, and an apparatus of the present disclosure can be implemented as, a special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer can be at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means can additionally be provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the present disclosure can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The present disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the present disclosure, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server can be generally remote from each other and typically interact through a communication network. The relationship of client and server arises by virtue of computer programs running on the respective computers and having a client-server relationship to each other.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for operating a mobile device having a display, a main memory, and a display memory that is coupled to the display, the method comprising:

predicting, by a processor of the mobile device, at a first time, a user-context that is to occur at a second time, subsequent to the first time;

transforming, by the processor and prior to the second time, one or more data items associated with the predicted user-context to corresponding data images;

storing, by the processor and prior to the second time, the corresponding data images in the main memory in combination with image attributes that define at least one of an activity, a role, or an environment, the data images containing image data that are in a respective data format to be sent to the display memory for visualization on the display;

identifying, by the processor at the second time, the present user-context;

determining, by the processor at the second time, whether the stored data images correspond to the identified user-context, by comparing the image attributes with attributes of the identified user-context;

selecting, by the processor and in response to a determination that the stored data images correspond with the identified user-context, the data images in the main memory transferring, by the processor, the selected data images to the display memory;

accessing, by the processor, the selected data images in the display memory; and displaying the selected data images from the display memory on the display.

2. The method according to claim 1, wherein the selecting of data images includes providing a layout of the selected data image that is adapted to the display.

3. The method according to claim 1, wherein the selecting of data images comprises at least one of enlarging the data image and reducing a size of the data image.

4. The method according to claim 1, wherein the selecting of data images comprises prioritizing the access of the selected data images in the display memory.

5. The method according to claim 1, wherein the transforming of the selected data items comprises providing data images that have a pixel dimension corresponding to a pixel dimension of the display.

6. The method according to claim 1, wherein the selecting of the data images comprises overwriting the data images in the display memory.

7. The method according to claim 1, wherein the accessing of the selected data images in the display memory comprises displaying the selected data images in the display as a translucent image so that earlier displayed images remain visible.

8. The method according to claim 1, wherein the identifying of the user-context comprises processing data that is selected from the group consisting of: data that represents a role of a user, data that represents an activity of the user, data that represents a location of the mobile device, data that represents a status of workflow items that form part of the data items, data that represents a skill set of the user, and data that represents an environment of the mobile device.

9. The method according to claim 1, wherein the identifying of the user-context comprises processing data that is obtained through user interaction.

10. The method of claim 1, further comprising:
determining a priority of a data image present in the main memory; and
preventing, as a function of the determined priority, the access of the data image in the display memory.

11. The method of claim 1, wherein accessing, by the display memory, further comprises at least partially overwriting a larger version of a data image with a smaller version of the data image in the display memory while maintaining the larger version of the data image in the main memory.

12. The method of claim 1, further comprising:
receiving, by the mobile device, one or more data items from a remote server; and
determining, by the mobile device, the user-context as a function of content of the data items.

13. A non-transitory computer-readable recording medium having tangibly recorded thereon a computer program that causes a processor of a mobile device having a display, a main memory and a display memory that is coupled to the display, to, when the program is executed, carry out a method of operating the mobile device, the method comprising:
predicting, at a first time, a user-context that is to occur at a second time, subsequent to the first time;
transforming, prior to the second time, one or more data items associated with the predicted user-context to corresponding data images;
storing, prior to the second time, the corresponding data images in the main memory in combination with image attributes that define at least one of an activity, a role, or an environment, the data images containing image data that are in a respective data format to be sent to the display memory for visualization on the display;
identifying, at the second time, the present user-context;
determining, at the second time, whether the stored data images correspond to the identified user-context by comparing the image attributes with attributes of the identified user-context;
selecting, in response to a determination that the stored data images correspond with the identified user-context, the data images in the main memory
transferring the selected data images to the display memory;
accessing the selected data images in the display memory; and
displaying the selected data images from the display memory on the display.

14. A mobile device comprising: a display;
at least one processor;
a main memory having tangibly recorded thereon an executable computer program; and
a display memory coupled to the display, wherein the at least one processor, in combination with the main memory and the display memory, is configured to execute the computer program to:
predict, at a first time, a user-context that is to occur at a second time, subsequent to the first time;
transform, prior to the second time, one or more data items associated with the predicted user-context to corresponding data images;
store, prior to the second time, the corresponding data images in the main memory in combination with image attributes that define at least one of an activity, a role, or an environment, the data images containing image data that are in a respective format to be sent to the display memory for visualization on the display;
identify, at the second time, the present user-context;
determine, at the second time, whether the stored data images correspond to the identified user-context by comparing the image attributes with attributes of the identified user-context;
select, in response to a determination that the stored data images correspond with the identified user-context, the data images in the main memory
transfer the selected data images to the display memory;
access the selected data images in the display memory; and
displaying the selected data images from the display memory on the display.

15. The mobile device according to claim 14, wherein the at least one processor comprises a central processing unit and a graphic processing unit,
wherein the main memory is associated with the central processing unit, and the display memory is associated with the graphic processing unit.

16. The mobile device according to claim 15, further comprising a transformation module implemented by the graphic processing unit, and
wherein the graphic processing unit is configured to return each data image to the main memory.

17. The mobile device according to claim 16, wherein the display memory is implemented by a shared portion in the main memory.

18. The mobile device according to claim 14, wherein the at least one processor, in combination with the main memory and the display memory is further configured to execute the computer program to:

transform a first data item to a first data image that includes a first portion having a high priority and a second portion having a low priority;

transform a second data item to a second data image that includes a third portion having a high priority and a fourth portion having a low priority;

merge the first data image with the second data image by concurrently displaying the first portion of the first data image with the third portion of the second data image.

19. The mobile device according to claim 14, further comprising:

a battery;

wherein the at least one processor, in combination with the main memory and the display memory, is further configured to execute the computer program to:

determine whether the mobile device is operating on power from a battery or from another power source;

delay, in response to a determination that the mobile device is operating on power from the battery, transformation of the one or more data items associated with the predicted user-context to corresponding data images.

20. The mobile device according to claim 14, wherein the at least one processor, in combination with the main memory and the display memory, is further configured to execute the computer program to predict the user-context at the first time based on a workflow that indicates a present activity of the user and a future activity of the user.

* * * * *